(12) United States Patent
Li et al.

(10) Patent No.: US 8,007,730 B2
(45) Date of Patent: Aug. 30, 2011

(54) SYNTHETIC METHOD AND AUTOMATION DEVICE FOR FLUORINE-18-ACETATE

(75) Inventors: Ming-Hsin Li, Taoyuan County (TW); Hsin-Ell Wang, Taoyuan County (TW); Chun-Yi Wu, Taoyuan County (TW); Wuu-Jyh Lin, Taoyuan County (TW)

(73) Assignee: Institute of Nuclear Energy Research, Longtan, Taoyuan (TW)

( * ) Notice: Subject to any disclaimer, the term of this patent is extended or adjusted under 35 U.S.C. 154(b) by 271 days.

(21) Appl. No.: 12/478,787

(22) Filed: Jun. 5, 2009

(65) Prior Publication Data
US 2010/0310428 A1 Dec. 9, 2010

(51) Int. Cl.
*G21C 1/00* (2006.01)
*G05B 1/00* (2006.01)
*G05D 16/00* (2006.01)
*B01J 19/00* (2006.01)

(52) U.S. Cl. ........ 422/159; 422/105; 422/112; 422/129; 422/130

(58) Field of Classification Search ................ 422/105, 422/112, 129, 130, 159; 536/122
See application file for complete search history.

(56) References Cited

U.S. PATENT DOCUMENTS
2005/0209737 A1* 9/2005 Kircher et al. ............... 700/266
2008/0159927 A1* 7/2008 Smit et al. .................... 422/188
* cited by examiner

*Primary Examiner* — Walter D Griffin
*Assistant Examiner* — Natasha Young

(57) ABSTRACT

An automatic synthesis device for fluorine-18-ACETATE ($[^{18}F]$fluoroacetate) consists of a machinery housing that has multiple reactors and multiple raw material containers, and uses multiple control valves between each reactor and container, and operates the control valves through a control system to charge the raw material from each container to each reactor in an automatic and sequential fashion to execute the six procedures: fluorination, azeotropic dewatering, synthesis (reaction with precursors), purification and separation, hydrolysis and neutralization, purification and collection. The operation simply requires adding raw materials to the containers in advance, turning on power, charging reactive gases. In 50 minutes, the process to produce the product will be completed. The operation is really simple and can effectively improve production efficiency.

10 Claims, 3 Drawing Sheets

SYNTHETIC METHOD AND AUTOMATION DEVICE FOR FLUORINE-18-ACETATE

BACKGROUND OF THE INVENTION

1. Field of the Invention

The invention is related to an automatic synthesis device to produce fluorine-18-ACETATE that is suitable for brain tomography in nuclear medicine. Especially it refers to a synthesis device for man-made radioactive isotope with easy operation and good production efficiency.

2. Description of the Prior Art

Fluorine-18 is a man-made radioactive isotope with half life as short as 109.8 minutes. Fluorine-18 labeled ACETATE can be used as tumor imaging drug, especially for the Positron Emission Tomography (PET) that is used in Clinical diagnosis for Prostate cancer tumor.

Fluorine-18-FET was first synthesized by German scientist Coenen in 1989. Later Wester et al (J. Nucl. Med. 1999; 40:205-212) improved the production method by shortening the process to 80 minutes. However, all their methods needed high efficiency liquid chromatography separation column to purify and separate the product. In this way, not only the operation is difficult but also the design for automation is complicated. Until now, there has not been an automatic synthesis device with easy operation and cost-effectiveness.

In view of the shortcomings with the traditional production device for fluorine-18-ACETATE, the inventor has sought improvement and finally came up with the invention.

SUMMARY OF THE INVENTION

The main objective for the invention is to provide an automatic synthesis device to produce fluorine-18-ACETATE, and as a result, the automation mechanism can effectively integrate all manufacturing processes, simplify operation, shorten production time and increase production efficiency.

Another objective for the invention is to provide an automatic synthesis device to produce fluorine-18-ACETATE, and as a result, the product has radioactive chemical purity larger than 85% and assures excellent quality.

To attain the above objectives and benefits, the technical approaches by the invention include: a machinery housing that has an accommodating space and at least an open display section on one side; multiple raw material containers located in the display section to hold the required TBAHCO3, precursor, dichloromethane, acetone, alcohol, hydrochloric acid and sodium hydroxide etc.; multiple reactors located in the display section and connecting to each raw material container through pipelines; multiple collection containers connecting to each reactor through pipelines; multiple control valves located on the pipelines to control the flow direction for raw material gas and vacuum and facilitate each raw material to undergo synthesis reaction in the reactor; a computer control system that stores control programs and outputs control signals in sequence to control the operation of each component and execute the reaction procedures.

According to the above-mentioned structure, in the machinery housing there are two reactors and between which there is a silicone column.

According to the above-mentioned structure, the two reactors connect to a heating apparatus.

According to the above-mentioned structure, the two reactors connect to an external injection system that injects the reaction intermediate from one reactor into the silicone column for separation and charges it into another reactor, and discharges the finished product from the second reactor to collection containers.

To further understand the above-mentioned objectives, benefits and characteristics for the invention, the following explanation with attached figures is provided.

DETAILED DESCRIPTION OF THE INVENTION

Figure 1:
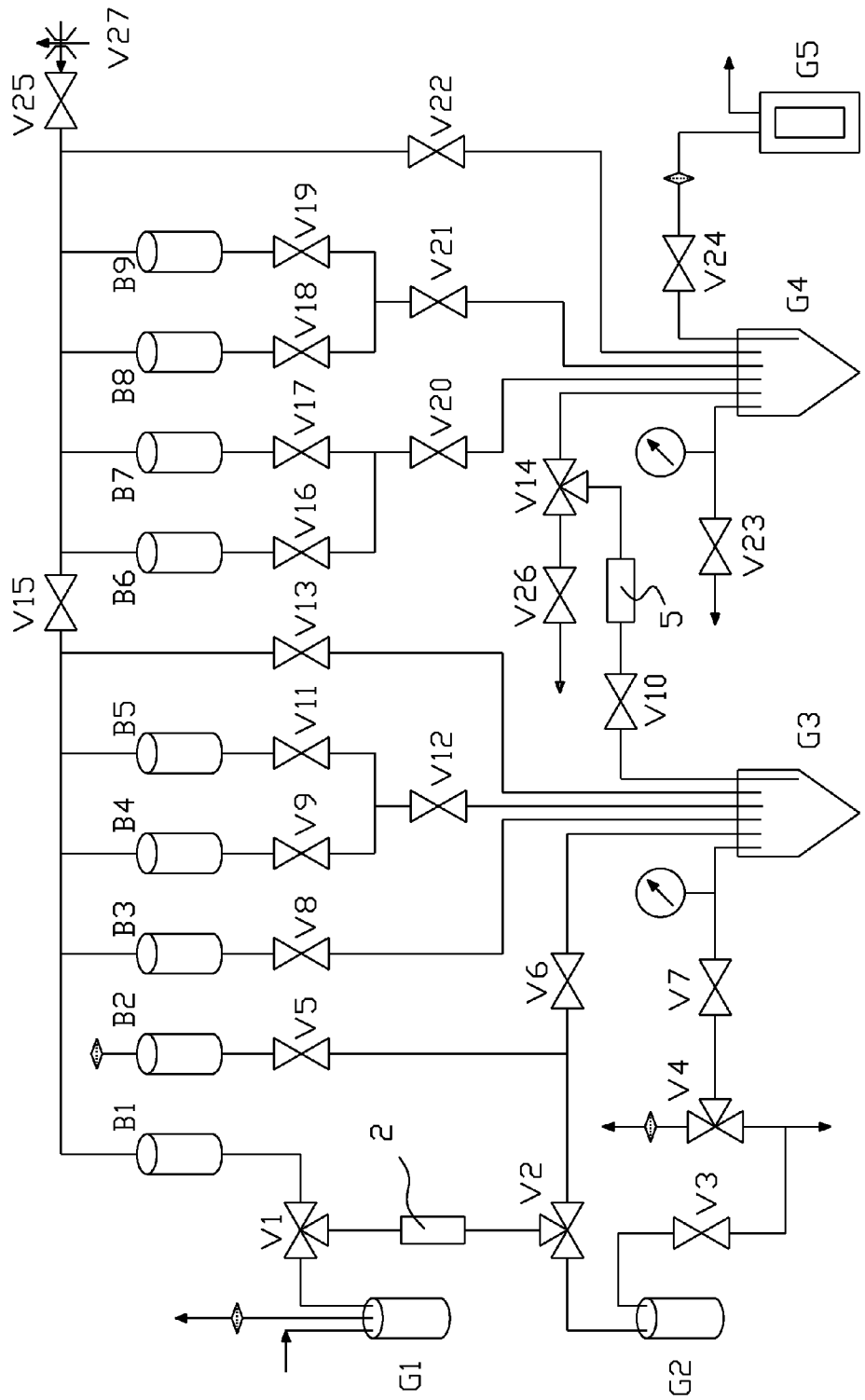
FIG. 1 shows the block diagram for the entire structure and pipeline configuration for the invention.
Figure 2:
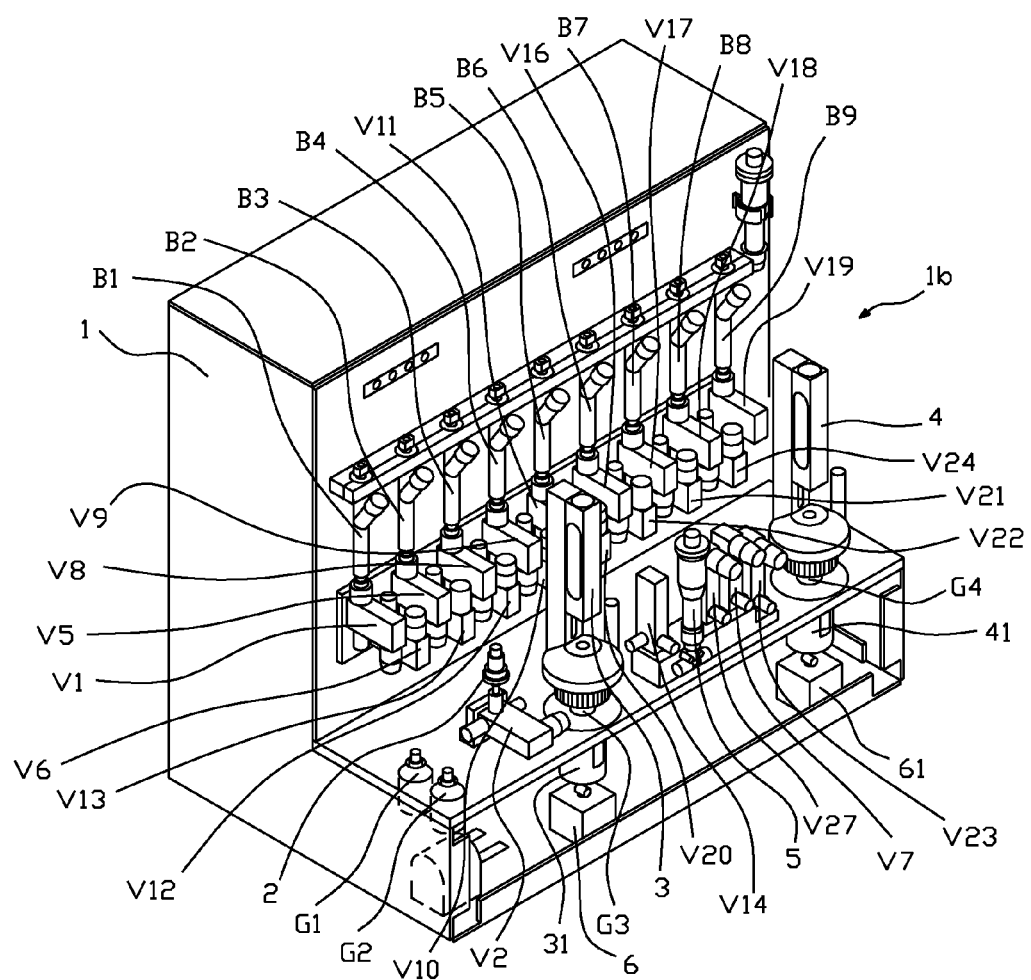
FIG. 2 is the front view for the assembly of the invention.
Figure 3:
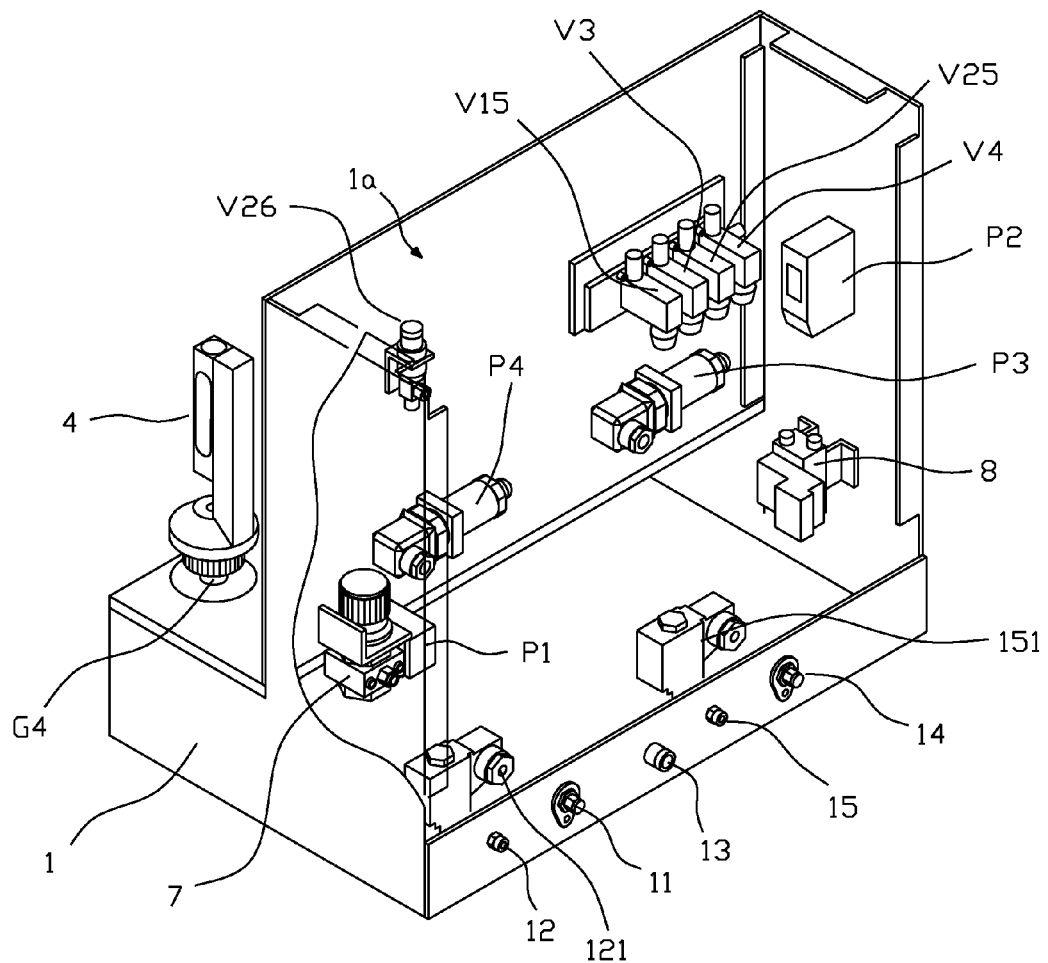
FIG. 3 is the rear view for the assembly of the invention.

Please refer to the figures from FIG. 1 to FIG. 3. It can be clearly found that the structure for the invention mainly consists of a machinery housing 1 that has an accommodating space 1a and at least an open display section 1b on one side of the machinery housing 1;

and multiple raw material containers B1~B9 located in the display section 1b of the machinery housing 1 with the raw material container B1 holding TBAHCO3, the raw material container B3 holding precursor, the raw material container B4 holding dichloromethane, the raw material container B5 holding acetone, the raw material container B6 holding alcohol, the raw material container B7 holding water, the raw material container B8 holding sodium hydroxide and the raw material container B9 holding hydrochloric acid; and two reactors G3, G4 in the accommodating space 1a of the machinery housing 1 that connect to the above-mentioned raw material containers B1~B9 through pipelines and are integrated with heating apparatus 31, 41, and between the two reactors G3, G4, a silicone column 5 allowing the two reactors G3, G4 to connect to two injectors 3, 4, with the injector 3 being able to inject the reaction intermediate from the reactor G3 into the silicone column 5 for separation and then introducing it into reactor G4, while injector 4 being able to introduce the finished product from reactor 4 into a sterile collection container for finished product G5; and another two collection containers G1, G2 located in the accommodating space 1a of the machinery housing 1 and being filled in advance with oxygen-18 water containing [18F]HF and connecting to reactor G3 through pipelines.

A multiple number of control valves V1~V27 are located on the pipelines (distribution diagram as shown in FIG. 1). V1, V2, V4 and V14 are three-way solenoid valves. V3, V5~V13 and V15~V26 are normal-close solenoid valves. Flow control valve V27 is a needle valve to control helium flow. Overall, the valves are to control the flow of raw material gas and vacuum and facilitate each raw material to undergo synthesis reaction in the reactors G3, G4. Between three-way solenoid valves V1, V2, there is a QMA ion exchange column 2. Besides, in the accommodating space 1a there is a pressure regulating valve 7 to regulate helium gas pressure and a valve block 8 to distribute compressed air. On the lower side of the two reactors G3, G4 there is a lead shielding 6, 61 containing Geiger tube for each one to monitor the radiation strength signal during the reaction process.

To facilitate connection to various gas raw material supply sources or vacuum source, on the side of the machinery housing 1 there are two exhaust joints 11, 14 to connect to cooling air, a helium joint 12 for helium supply, a vacuum connector 13 and a gas inlet connector 15 to introduce compressed air; to connect to external computer control system, the invention also has an electric controller (not shown), which not only control all the solenoids V1~V27 but also connect to multiple pressure measuring tubes P1~P4 and related detection units to obtain various measurement signals (reaction time, temperature, pressure and radioactivity data) and feedback to the computer control system for synchronous recording, and also control the entire synthesis system through the obtained signals and process conditions in fully automatic or semi-automatic operation.

The above-mentioned components are operated as follows: first, the [18F] HF containing oxygen-18 water in the collection container G1 is withdrawn by vacuum into QMA ion exchange column 2. While [fluorine-18] anion is absorbed, oxygen-18 water is introduced into the collection container G2; the TBAHCO3/CAN solution in raw material container B1 is then withdrawn by vacuum into QMA ion exchange column 2, and its reaction with [fluorine-18] anion occurs to form TBA18F that will be introduced into reactor G3; then, vacuum and heating are used for drying.

Then 1 ml anhydrous CAN (acetonitrile) solution from raw material container B2 is injected into the dried reactor G3; then heated to 110° C. and subject to depressurization and drying; and reactor G3 is cooled to 30° C.; while evaporating the organic solvent (ACN), the vapor can be introduced to an external solvent condenser and recycled as liquid through vacuum and condensation by liquid nitrogen.

5 μL ethylbromoacetate in raw material container B3 is added into reactor G3 and dissolved in 1.0 mL anhydrous acetonitrile. The reaction takes place at 110° C. for 10 minutes to form the intermediate 9G) with protective group. Then, reactor G3 is cooled to 30° C.

The solution in reactor G3 is injected into reactor G4 through silicone column 5. The dichloromethane in raw material container B4 is injected into reactor G3 with carrier gas through control valve. The dissolved intermediate (G) is introduced into silicone column 5 and then being absorbed, and also injected to reactor G4. The effluent is introduced to an external waste liquid container.

Then, the 1N NaOH in the raw material container B8 is injected into reactor G4 with carrier gas through control valve and reactor G4 is heated to 80° C. to start reaction, and vacuum and drying are applied; ad compressed air is used to cool reactor G4 to 70° C.

The hydrochloric acid in raw material container B9 and the water in raw material container B7 are injected into reactor G4 with carrier gas through control valve; after neutralization and dilution for reaction intermediate (N) solution, fluorine-18-FET product solution (Pa) is obtained; at last, the FET initial product in reactor G4 is introduced to filtration membrane with carrier gas through control valve; after filtration, fluorine-18-FET finished product is charged to the sterile collection container for finished product G5.

The following uses an embodiment to explain the operation for the above-mentioned structure.

The 18F-ACETATE process (TBAF method) which the invention is applicable to generally consists of six steps: fluorination, azeotropic dewatering, reaction with precursor (synthesis), purification and separation, hydrolysis and neutralization, purification and collection. The following will explain the process step by step.

1. First, before the above-mentioned process is started, a preparatory process is conducted and it consists of the following steps:
    (1) Condition QMA ion exchange column: pass 10 mL $K_2CO_3$ (6.19 g/100 mL) through QMA ion exchange column 2 and then pass 10 mL $H_2O$, and blow it dry.
    (2) Condition silicone column (light silica sep-pak; Waters, WAT023537): pass 5 mL ACN through silicone column 5.
    (3) Start vacuum.
    (4) Start helium and compressed air.
    (5) Light silica is Sep-Pak cartridge (Waters, WAT023537) and the other one is plus C18 Sep-Pak cartridge (Waters, WAT020515).

2. Fluorination Process
    (1) Open three-way solenoid valves V1, V2 to pass [$^{18}$F]HF containing oxygen-18 water from collection container G1 through QMA ion exchange column 2 (1 mL/min) into collection container G2 (pay attention to activity variation in the recycle bottle).
    (2) After 30 seconds, shut off three-way solenoid valves V1, V2.
    (3) Open normal-close solenoid valves V25, V15, V13 to pass external helium through flow control valve V27 to fill reactor G3.
    (4) After 10 seconds, shut off normal-close solenoid valve V13; open three-way solenoid valve V2 and normal-close solenoid valve V6.
    (5) Open three-way solenoid valve V1 to allow 1.0 mL $TBAHCO_3$ solution to flow from raw material container B1 through QMA ion exchange column 2 (1 mL/min) into reactor G3.
    (6) After 5 seconds, open three-way solenoid valve V4 first and then normal-close solenoid valve V7.
    (7) After 10 seconds, switch on three-way solenoid valve V4 (applying vacuum); after 5 seconds, shut off three-way solenoid valves V1, V2 and normal-close solenoid valve V6.
    (8) Heat reactor G3 to 110° C.; charge helium (by using flow control valve V27 to adjust flow rate to 60 mL/min and prevent eruptive boiling) and apply vacuum until liquid barely remains.
    (9) Stop heating and shut off normal-close solenoid valve V13.

3. Azeotropic Dewatering Process
    (1) Open three-way solenoid valves V1, V2 and normal-close solenoid valves V5, V6; charge 1 mL anhydrous acetonitrile from raw material container B2 into reactor G3.
    (2) Shut off three-way solenoid valves V1, V2 and normal-close solenoid valves V5, V6.
    (3) Open normal-close solenoid valve V13 and heat reactor G3 to 110° C., and apply vacuum until liquid barely remains.
    (4) Repeat the above-mentioned (1)~(3) steps twice; allow steam and acetonitrile to undergo azeotropic distillation until no liquid remains.
    (5) Stop heating.
    (6) Cool reactor G3 to 60° C.
    (7) Stop cooling and shut off normal-close solenoid valve V7.

4. Precursor Reaction Process
    (1) After 5 seconds, shut off normal-close solenoid valve V13 (fill reactor G3 with helium); open three-way solenoid valve V4 and normal-close solenoid valves V7, V8 in sequence; add 5 mL ethylbromoacetate from raw material container B3 into reactor G3 and dissolve it into 1.0 mL anhydrous acetonitrile.
    (2) After 20 seconds, shut off normal-close solenoid valve V8 and three-way solenoid valve V4 in sequence; after 5 seconds, shut off normal-close solenoid valve V7; heat up reactor G3 to 110° C. and run reaction for 10 minutes.
    (3) Stop heating; cool reactor G3 to 30° C.; then stop cooling.

5. Purification and Separation Process
    (1) Open normal-close solenoid valves V23, V25, V10, V13, V15 and three-way solenoid valves V4, V14 to allow the solution to flow from reactor G3 through silicone column 5 into reactor G4.

(2) After 1 second, shut off, shut off normal-close solenoid valves V13, V10 and three-way solenoid valve V14.

(3) Open normal-close solenoid valves V9, V12, V7 and three-way solenoid valve V4 to allow 0.5 mL acetonitrile to flow from raw material container B4 into reactor G3.

(4) After 10 seconds, shut off normal-close solenoid valves V9, V12, V7 and three-way solenoid valve V4.

(5) Open normal-close solenoid valves V13, V10 and three-way solenoid valve V14 to allow the solution to flow from reactor G3 through silicone column 5 into reactor G4.

(6) After 1 minute, shut off normal-close solenoid valves V13, V10, V15, V23, V25 and three-way solenoid valves V4, V14.

6. Hydrolysis Process (1) Open normal-close solenoid valves V18, V21 to allow 0.5 mL 1N NaOH to flow from raw material container B8 into reactor G4; after 10 seconds, shut off normal-close solenoid valves V18, V21.

(2) Heat reactor G4 to 80° C. to start hydrolysis reaction.

(3) After 5 minutes, open normal-close solenoid valves V22, V23, V25 to vacuum dry reactor G4.

(4) Shut off normal-close solenoid valves V22, V23, V25 and stop heating; start cooling reactor G4 to 70° C.; then stop cooling.

7. Neutralization Collection Process (1) Open normal-close solenoid valves V19, V21, V24 to allow 0.5 mL 1N HCl to flow from raw material container B9 into reactor G4 to neutralize the product; after 10 seconds, shut off normal-close solenoid valves V19, V21.

(2) Open normal-close solenoid valves V17, V20 to charge 100 mL PBS and 3.5 mL aqueous solution from raw material container B7; after 10 seconds, shut off normal-close solenoid valves V17, V20.

(3) Cool reactor G4 to room temperature; then stop cooling.

(4) Open normal-close solenoid valves V24, V22 to allow the product to pass through 0.22 μm filter into the sterile collection container for finished product G5; final product is obtained there.

The invention also has cleaning function, which process is as follows:

1. Clean reactor G3 (with acetone)

(1) Remove QMA ion exchange column 2 and silicone column 5, and put back the two terminal connectors.

(2) Add 1 mL acetone to the cleaned raw material container B1; heat reactor G3 to 40° C. and at the same time open three-way solenoid valve V2 and normal-close solenoid valves V6, V7 to apply vacuum.

(3) Open three-way solenoid valve V1 to allow acetone to fill reactor G3, and apply mixing.

(4) After 30 seconds, shut off three-way solenoid valves V1, V2 and normal-close solenoid valves V6, V7.

(5) Charge raw material container B3 with 1 mL acetone and open normal-close solenoid valves V8, V7 and three-way solenoid valve V4; use pressurized helium to fill acetone into reactor G3 and start mixing; release pressure through normal-close solenoid valve V7 and three-way solenoid valve V4; after 30 seconds, shut off normal-close solenoid valves V7, V8.

(6) Insert the needle into reactor G3 and open normal-close solenoid valves V13, V10, V15; use pressurized helium to discharge acetone from reactor G3 into the external waste solution bottle; after 25 seconds, shut off normal-close solenoid valves V13, V10.

(7) Fill 3 mL acetone into raw material container B4 and open normal-close solenoid valves V9, V12 to allow acetone to fill into reactor G3 and start mixing; pressure is released by normal-close solenoid valve V7 and three-way solenoid valve V4; after 25 seconds, shut off normal-close solenoid valve V9.

(8) Insert the needle into reactor G3 and open normal-close solenoid valves V13, V10, V15 and use pressurized helium to discharge acetone from reactor G3 into the waste solution bottle; after 25 seconds, shut off normal-close solenoid valves V13, V10.

2. Blow dry reactor G3

(1) Fill 3 mL acetone into raw material container B5; open normal-close solenoid valves V11 and V12; fill acetone into reactor G3 and start mixing; pressure is released through normal-close solenoid valve V23 and three-way solenoid valve V4; after 30 seconds, shut off three-way solenoid valve V4 and normal-close solenoid valves V11, V12, V7.

(2) Heat reactor G3 in a closed state to 85° C. and maintain constant temperature for 5 minutes.

(3) Open normal-close solenoid valves V13, V10, V15, V24, V25 and three-way solenoid valve V14; use pressurized to discharge acetone from reactor G3 into reactor G4 and start mixing; after 30 seconds, shut off normal-close solenoid valves V13, V10, V15.

(4) Heat reactor G3 to 120° C.

(5) Open normal-close solenoid valves V13, V10, V15, V23, V25 and three-way solenoid valves V14, V4; use helium to continue to blow dry.

(6) After 1 minute, shut off normal-close solenoid valves V13, V10, V15, V23, V25 and three-way solenoid valves V14, V4.

(7) After two minutes, open normal-close solenoid valves V6, V8, V7 and vacuum reactor G3 and raw material container B3; after 3 minutes, shut off normal-close solenoid valve V8 and then open normal-close solenoid valves V9 and V12.

(8) After raw material container B4 is vacuumed for 3 minutes, shut off normal-close solenoid valve V9 and open normal-close solenoid valve V11.

(9) After raw material container B5 is vacuumed for 3 minutes, shut off normal-close solenoid valves V11, V6, V7, V12.

(10) Open normal-close solenoid valves V13, V10, V15, V25 and pass helium.

(11) Through solenoid V14, pass helium every 10 seconds to blow dry (three times in 60 seconds).

(12) Through solenoid V14, continue to pass helium for 2 minutes; and then shut off normal-close solenoid valves V13, V10, V24 and three-way solenoid valve V14.

(13) Cool reactor G3 to 60° C. and at the same time open normal-close solenoid valve V7 to vacuum reactor G3 (for 7 minutes).

3. Clean reactor G4 (with alcohol)

(1) Remove the filtration membrane that connects to normal-close solenoid valve V24; put back the pipeline; connect outlet to waste solution bottle.

(2) Open normal-close solenoid valves V22, V24, V25 and use pressurized helium to discharge acetone from reactor G4 to the waste solution bottle (for 30 seconds).

(3) Fill 1 mL alcohol into raw material container B9; open normal-close solenoid valves V19, V21, V24; fill alcohol into reactor G4 and start mixing; after 30 seconds, shut off normal-close solenoid valve V19.

(4) Fill 1 mL alcohol into raw material container B; open normal-close solenoid valve V18; fill alcohol into reactor G4 and start mixing; after 30 seconds, shut off normal-close solenoid valves V18, V21, V24.

(5) Open normal-close solenoid valves V22, V24, V25 and use pressurized helium to discharge alcohol from reactor G4 into the waste solution bottle (for 30 seconds).

(6) Fill 3 mL alcohol into raw material container B7; open normal-close solenoid valves V17, V20, V21, V23, V25; fill alcohol into reactor G4 and start mixing; after 30 seconds, shut off normal-close solenoid valves V17, V20, V21, V23.

(7) Open normal-close solenoid valves V22, V24 and use pressurized helium to discharge alcohol from reactor G4 into the waste solution bottle (for 30 seconds).

(8) Fill 1 mL alcohol into raw material container B6; open normal-close solenoid valves V16, V20, V23; fill alcohol into reactor G4 and start mixing; after 30 seconds, shut off normal-close solenoid valves V16, V20, V23.

4. Blow dry reactor G4

(1) Heat reactor G4 in a closed state to 100° C. and start mixing; maintain constant temperature for 5 minutes.

(2) Open normal-close solenoid valves V22, V24, V25 and use pressurized helium to discharge alcohol from reactor G4 into the waste solution bottle; after 1 minute, shut off normal-close solenoid valves V22, V24, V25.

(3) Open normal-close solenoid valve V23 and vacuum reactor G4; at the same time heat to 120° C.

(4) Open normal-close solenoid valves V18, V21 and vacuum dry raw material container B8; after 2 minutes, shut off normal-close solenoid valve V18.

(5) Open normal-close solenoid valve V19 and vacuum dry raw material container B9; after 2 minutes, shut off normal-close solenoid valves V19, V21.

(6) Open normal-close solenoid valves V17, V20 and vacuum dry raw material container B7; after 2 minutes, shut off normal-close solenoid valve V17.

(7) Open normal-close solenoid valve V16 and vacuum dry raw material container B6; after 2 minutes, shut off normal-close solenoid valve V16, V20 and V23, V21, and stop heating.

(8) Open normal-close solenoid valves V22, V24, V25 and use helium to blow dry normal-close solenoid valve V24; after 2 minutes, shut off normal-close solenoid valves V22, V24 and V25.

(9) Open normal-close solenoid valve V23 and vacuum dry reactor G4.

(10) Cool reactor G4 to 60° C.; at the same time, shut off normal-close solenoid valve V23 and stop vacuum.

In summary, the automatic synthesis device for fluorine-18-ACETATE in the invention has simplified process and improved production efficiency. It is an invention of innovation and progressiveness. The patent application is filed accordingly. However, the above description is only the preferred embodiment for the invention, any alteration, modification, change or equivalent replacement extended from the technical approach and scope shall be all fall into the scope of the patent application.

What is claimed is:

1. An automatic synthesis device for fluorine-18-ACETATE comprising:
    a machinery housing that has an accommodating space and at least an open display section on one side;
    multiple raw material containers located in the display section to hold the required raw materials, TBAHCO3, precursor, dichloromethane, acetone, alcohol, hydrochloric acid and sodium hydroxide etc.;
    multiple reactors located in the display section and connecting to each raw material container through pipelines;
    multiple collection containers connecting to each reactor through pipelines; multiple control valves located on the pipelines to control the flow direction for raw material gas and vacuum and facilitate each raw material to undergo synthesis reaction in the reactor; and
    a computer control system that stores control programs and outputs control signals in sequence to control the operation of each component and execute the reaction procedures.

2. The automatic synthesis device of claim 1, wherein the machinery housing fits two reactors inside with a silicone column between them.

3. The automatic synthesis device of claim 1, wherein the machinery housing fits at least one flow control valve inside to control the flow rate of external helium into the reactor.

4. The automatic synthesis device of claim 1, wherein the machinery housing fits at least one pressure regulating valve inside to regulate gas pressure for raw material supply.

5. The automatic synthesis device of claim 1, wherein the machinery housing fits at least one pressure measuring tube inside to monitor the synthesis reaction pressure.

6. The automatic synthesis device of claim 1, wherein the computer control system simultaneously records time, temperature, pressure and radioactivity during the reaction process.

7. The automatic synthesis device of claim 1, wherein the machinery housing fits at least one Geiger tube inside surrounded by lead shielding to monitor the radioactive signal strength during the reaction process.

8. The automatic synthesis device of claim 1, further comprising a solvent condenser to reclaim the volatile organic solvent by liquid nitrogen.

9. The automatic synthesis device of in claim 2, wherein the two reactors connect to a heating apparatus.

10. The automatic synthesis device of claim 3, wherein the two reactors connect to an external injection system that injects the reaction intermediate from one reactor into the silicone column for separation and then charges it into another reactor, and discharges the finished product from the second reactor to collection containers.

* * * * *